(12) United States Patent
Weeks (10) Patent No.: US 6,898,866 B2
(45) Date of Patent: May 31, 2005

(54) DIGITAL DISPLAY TAPE MEASURING DEVICE

(76) Inventor: Peggy Weeks, 318 Lincoln Ave., Valpariso, FL (US) 32580

( * ) Notice: Subject to any disclaimer, the term of this patent is extended or adjusted under 35 U.S.C. 154(b) by 0 days.

(21) Appl. No.: 10/341,631

(22) Filed: Jan. 14, 2003

(65) Prior Publication Data

US 2003/0131491 A1 Jul. 17, 2003

Related U.S. Application Data

(60) Provisional application No. 60/347,854, filed on Jan. 15, 2002.

(51) Int. Cl.[7] .............................................. G01B 3/10
(52) U.S. Cl. ............................. 33/762; 33/768; 33/771
(58) Field of Search ......................... 33/762, 763, 771, 33/755, 756, 759, 761, 768, 706, 708; 324/699, 719, 206, 207.11, 515, 516, 517, 518

(56) References Cited

U.S. PATENT DOCUMENTS

| | | | | |
|---|---|---|---|---|
| 4,186,490 A | * | 2/1980 | Quenot | 33/762 |
| 4,316,081 A | * | 2/1982 | Washizuka et al. | 377/18 |
| 4,438,391 A | * | 3/1984 | Rog et al. | 324/71.1 |
| 4,575,944 A | * | 3/1986 | Lin | 33/762 |
| 4,779,212 A | * | 10/1988 | Levy | 702/164 |
| 5,286,972 A | * | 2/1994 | Falk et al. | 250/231.16 |
| 5,433,014 A | | 7/1995 | Falk et al. | 33/763 |
| 5,544,420 A | * | 8/1996 | Choi | 33/760 |
| 5,743,021 A | | 4/1998 | Corcoran | 33/762 |
| 5,930,905 A | * | 8/1999 | Zabler et al. | 33/1 PT |
| 6,389,709 B1 | * | 5/2002 | Lunde | 33/768 |
| 6,581,296 B2 | * | 6/2003 | Ponce | 33/760 |
| 6,590,403 B1 | * | 7/2003 | Gramer et al. | 324/716 |

* cited by examiner

Primary Examiner—R. Alexander Smith
(74) Attorney, Agent, or Firm—J. Ronald Richbourg (57) ABSTRACT

A digital display tape measuring device is disclosed having a display screen exteriorly for displaying the measured distance. A tape having electrical conductivity capabilities and an insulator disposed longitudinally along the tape dividing the tape into two electrical conductors, and having a tip thereof electrically connecting both of the electrical conductors together such that an electrical circuit is formed with resistance that varies as the tape is extracted from device. An ohmmeter electrically coupled across the electrical circuit for measuring the circuit resistance. A microprocessor having inputs thereof coupled to outputs of the ohmmeter and having outputs coupled to said display screen. The microprocessor computes measurements made by as a function of the resistance measured by the ohmmeter.

14 Claims, 12 Drawing Sheets

DIGITAL DISPLAY TAPE MEASURING DEVICE

CROSS-REFERENCE TO RELATED APPLICATION

This is a continuation of Provisional Application No. 60/347,854, filed Jan. 15, 2002 having the same title and by the same inventor hereof.

BACKGROUND OF THE INVENTION

1. Field of the Invention

The present invention relates generally to a tape measuring device and more particularly to a measuring device that will accurately and efficiently compute and display a measured length.

2. Background of the Invention

It can be seen that numerous devices have been developed to improve conventional measuring tape devices. For example, U.S. Pat. No. 5,691,923 issued to Adler, et al, discloses a digital measuring system primarily for use in the manufacturing industry that will automatically and electronically measure and record distances and dimensions and then transform these measured distance and dimensions into electrical signals. Included in the digital measuring system is a control and display unit which allow the user to manipulate and record the digital data received from the tape measuring device into a useful format.

Another example is seen in U.S. Pat. No. 5,433,014 issued to Falk, et al, which discloses a digital tape rule including a built-in radio transmitter for transmitting measurements to a remote location. A receiving unit is provided at the remote location for receiving, storing, and displaying the measurements. This device was designed for use in wood-frame construction to alleviate confusion when calling out measurements to the saw operator who cuts the lumber to a desired specification.

Yet another example is seen in U.S. Pat. No. 5,743,021 issued to Corcoran which discloses a digital length gauge with an optical encoder for providing a measurement of distance having an accuracy of about 0.01 mm. Housed within the digital length gauge is a metal tape with uniformly sized and spaced holes positioned along the center line of the tape. When the metal tape is extracted and retracted into the length gauge, the holes engage pins positioned on a sprocket, thus causing the sprocket to rotate. The rotation of the sprocket will cause an optical encoder to rotate along the same axis, thus producing optical pulses to provide the desired accuracy.

Although numerous devices have been developed to improve conventional tape measures, none of these previous efforts utilize resistance measurements for determining a specific length measurement, a Hall effect sensor for sensing pulses generated by magnets for calculating a specific distance, or utilize a pressure sensor for determining the pressure differential conclusively retrieving the specific distance. In addition, none of the prior art utilizes more than one means of determining a calculated measurement, thereby preventing a measurement verification method.

As will be seen, prior art techniques do not suggest the present inventive combination of component elements as disclosed and claimed herein by providing a tape measure device that is accurate and efficient in determining measurements. In addition, the present invention is compact in size, lightweight and is a device that is user friendly in that it inherently renders a unit that can be used by anyone regardless of age or dexterity. Accordingly, the present invention achieves its intended purposes, objectives and advantages over the prior art device through a new, useful and unobvious combination of component elements.

SUMMARY OF THE INVENTION

The present invention is a tape measure device designed and configured to accurately and efficiently record and determine a measured distance. In determining distance, the present invention utilizes three different methods that can be used independently or optionally, can be combined to provide for a unit that will have at least two means of determining distance. Accordingly, the present invention provides a unit that will include a checking system for the measured distance.

In order to provide for such a configuration, the present invention comprises a housing adapted to house and maintain a retractable tape that is wound around a reel. Exteriorly located on the housing is a display screen that will display the measured distance.

The tape includes a unique structure for enabling various embodiments to be utilized for determining the length of the particular measurement. Enabling such a configuration, the tape comprises an elongated flexible polymer casing having low stretch characteristics. Located exteriorly on a side of the tape are conventional visible graduations for representing a particular measurement. The use of visible indicia provides a means for the user to read and determine a particular measurement via the tape.

The casing for the tape is a circuit film that encloses a non-conductive liquid gel. This circuit film is a continuous member that extends the entire length of the tape. Located along the centerline of the tape is a wear surface that insulates the circuit film into two separate paths. This wear surface is adapted to contact a friction bearing. Thereby providing for the friction bearing to rotate on the wear surface as the tape is extracted from the housing.

In a first embodiment for determining a measured length, resistance measurement is utilized. In this configuration, as the strip is extracted from the housing, it passes through the friction bearings. This movement causes the bearings to rotate as the tape is extracted. The friction bearing applies pressure to the strip via the wear surfaces located on the upper and lower surface, forcing the liquid gel to the reel end of the tape strip. At the same time, the circuit film makes contact with the circuit film to complete an electrical circuit. Current is applied to the circuit film for enabling resistance to be measured. This measured resistance in the circuit is applied to a linear algorithm that computes the amount of tape extracted. The computed measurement is then displayed on the display screen.

In addition to providing a closed circuit, the friction bearing also provides for a differential in volume between the end of the tape to the friction bearing and from the friction bearing to the reel. The frictional bearing pinches on the casing forcing the area of contact of the wear surfaces to be free of liquid gel. This causes the excess gel to be displaced and thus provide for the differential in volume within the casing. Knowing the volume, which is measured via a pressure sensor, the distance is calibrated.

Still a further method for measuring distance is the use of magnets for sensing linear position. In order to allow for such a configuration a friction gear is provided. This gear is coupled to the friction bearing. As the tape is pulled from the housing, it passes through the friction bearing. This causes the bearing to rotate consequently causing the friction gear to rotate. Secured to the side of the friction gear is a plurality of magnets. Located above the friction gear is a linear magnetic sensor, such as a linear Hall Effect Sensor. The magnets form a magnetic field wherein as each magnet passes it is recognized by the linear sensor. After seizing rotation, the linear sensor can determine the distance traveled which is equal to the length of the measurement.

In use, at least one of the means of measurement is used by the tape measuring device of the present invention. In the preferred embodiment, at least two are utilized for providing an adequate and accurate means for determining a particular measurement.

Accordingly, it is the object of the present invention to provide for a tape measuring device that will overcome the deficiencies, shortcomings, and drawbacks of prior tape measuring devices and methods thereof.

Still another object of the present invention is to provide a tape-measuring device that during use will simultaneously enhance error checking in order to reduce the probability of user error, by providing at least one automatically measuring means.

Another object of the present invention, to be specifically enumerated herein, is to provide a tape measuring device in accordance with the preceding objects and one which will conform to conventional forms of manufacture, be of simple construction and easy to use so as to provide a device that is economically feasible, long lasting and relatively trouble free in operation.

Although there have been many inventions related to tape measuring devices, none of the inventions provide for multiple means for determining a particular measurement. Additionally, many of these prior inventions fail to be low cost and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features of the application of the intended invention. Many other beneficial results may be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DETAILED DESCRIPTION OF THE PREFERRED EMBODIMENTS

With reference to the drawings, in particular to FIGS. 1–8 thereof, the present invention; a digital display-measuring device, generally denoted by reference numeral 10 will be described. The purpose of the present invention is to provide for a tape measuring device designed and configured to accurately and efficiently record and determine a measured distance.

Figure 1:
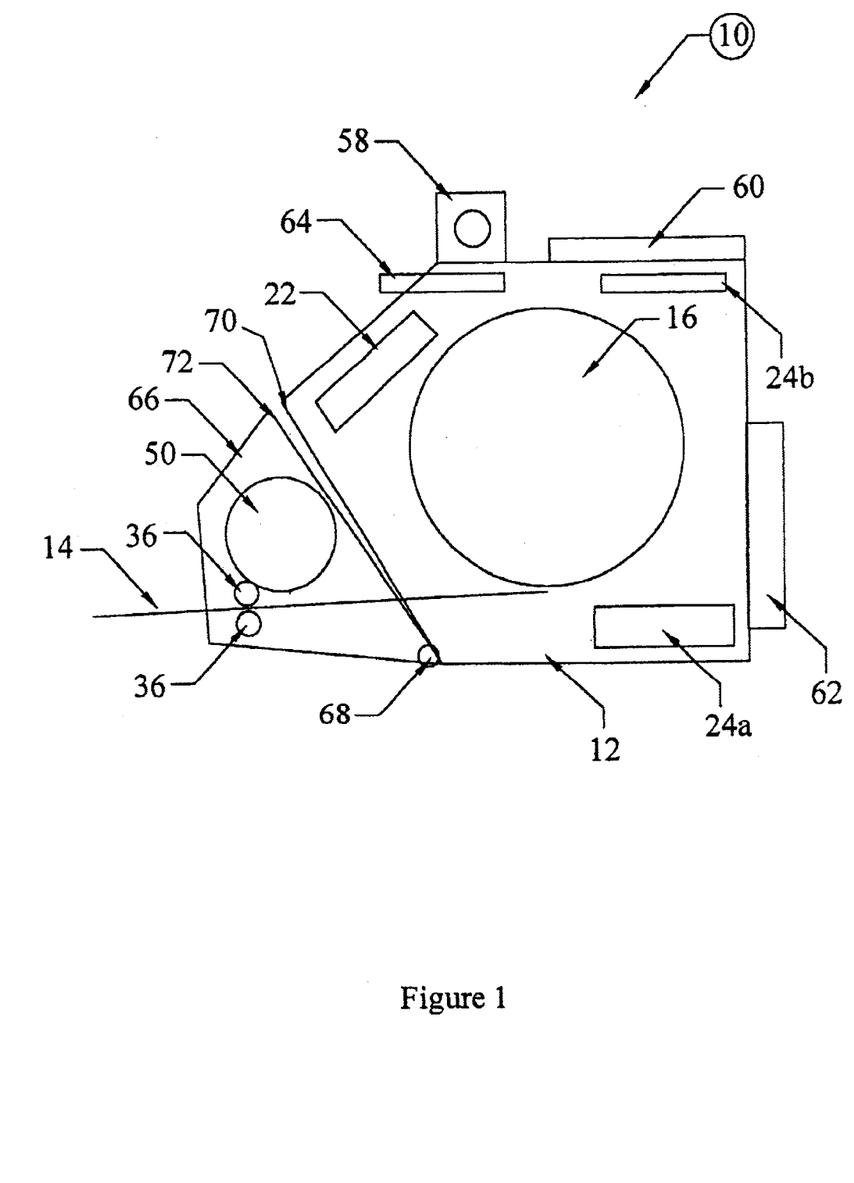
FIG. 1 is a cross-sectional view of the housing unit illustrating the components used with the digital display measure device of the present invention.
Figure 2:
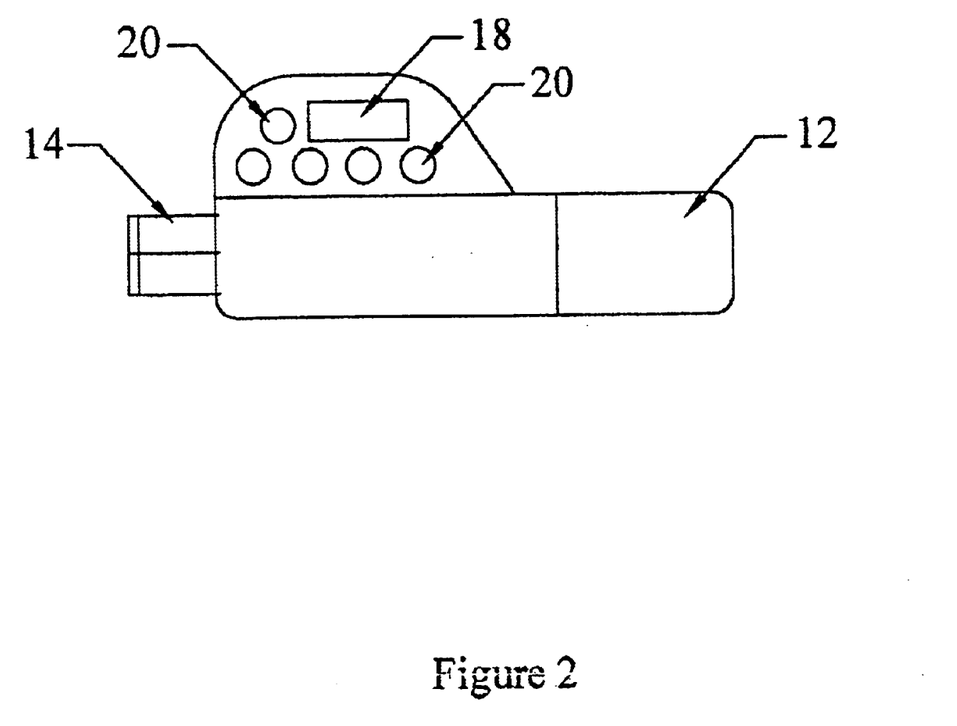
FIG. 2 is a top view of the housing unit used with the digital display-measuring device of the present invention.
Figure 3A:
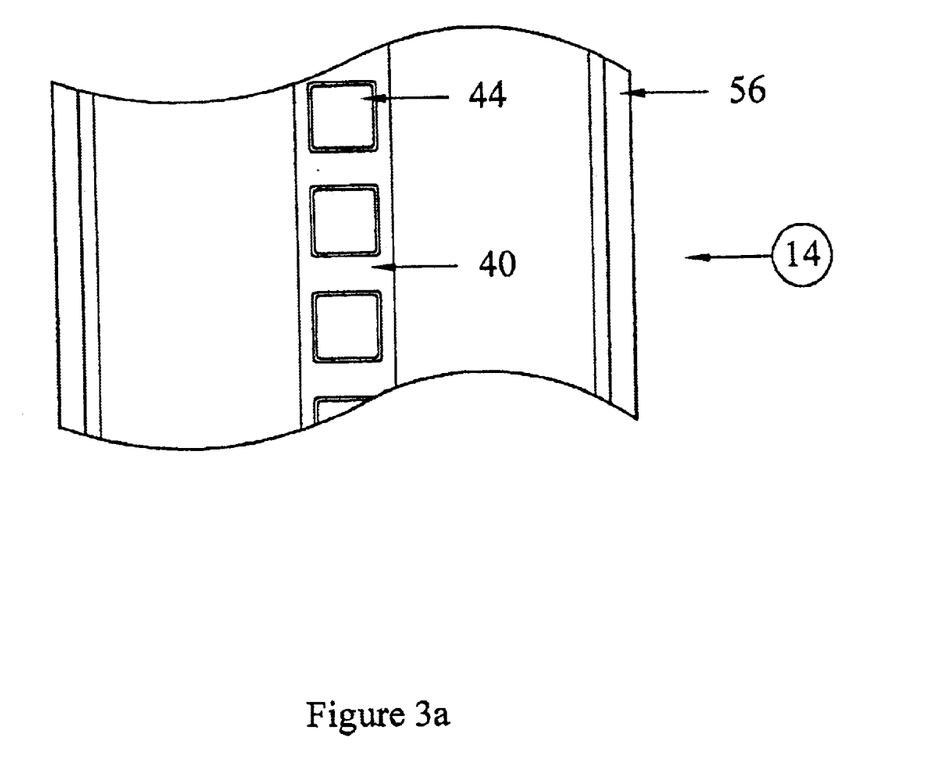
FIG. 3a is a top view of the first embodiment of the tape used in the digital display measure device of the present invention.
Figure 3B:
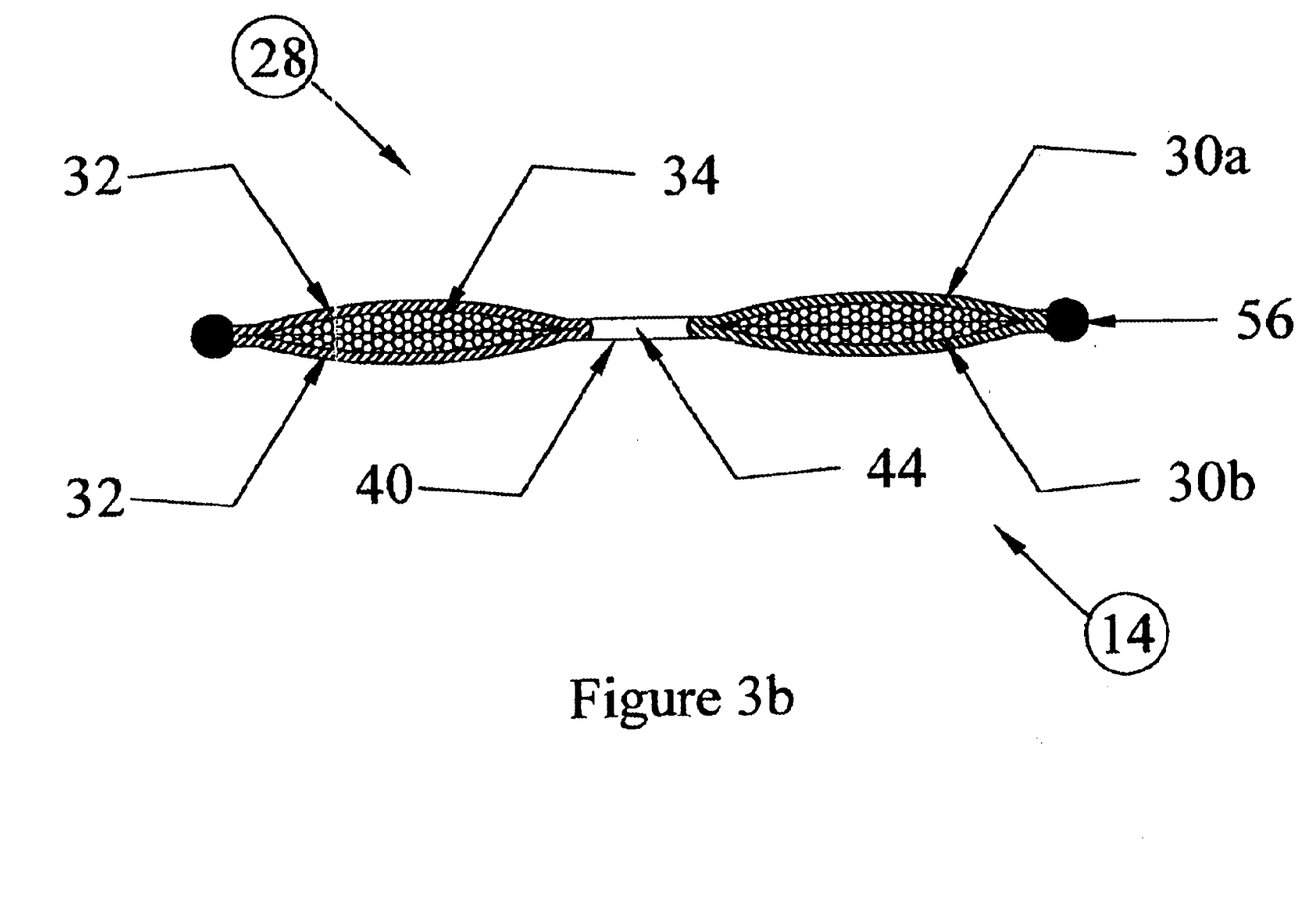
FIG. 3b is a cross-sectional view of the first embodiment of the tape used in the digital display measure device of the present invention.
Figure 4A:
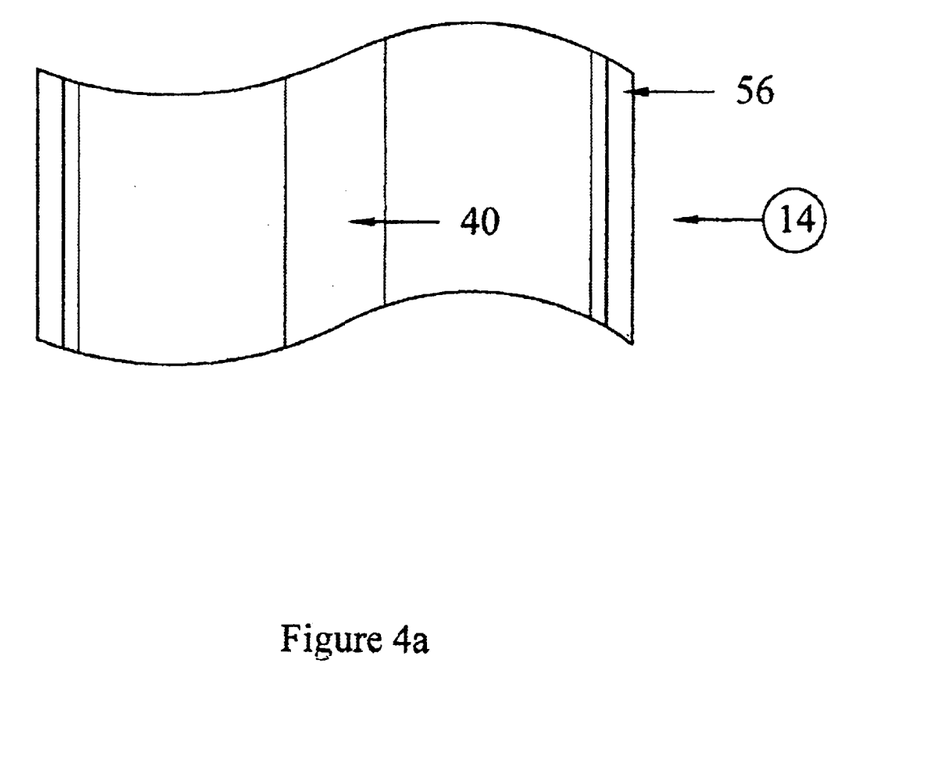
FIG. 4a is a top view of the second embodiment of the tape used in the digital display measure device of the present invention.
Figure 4B:
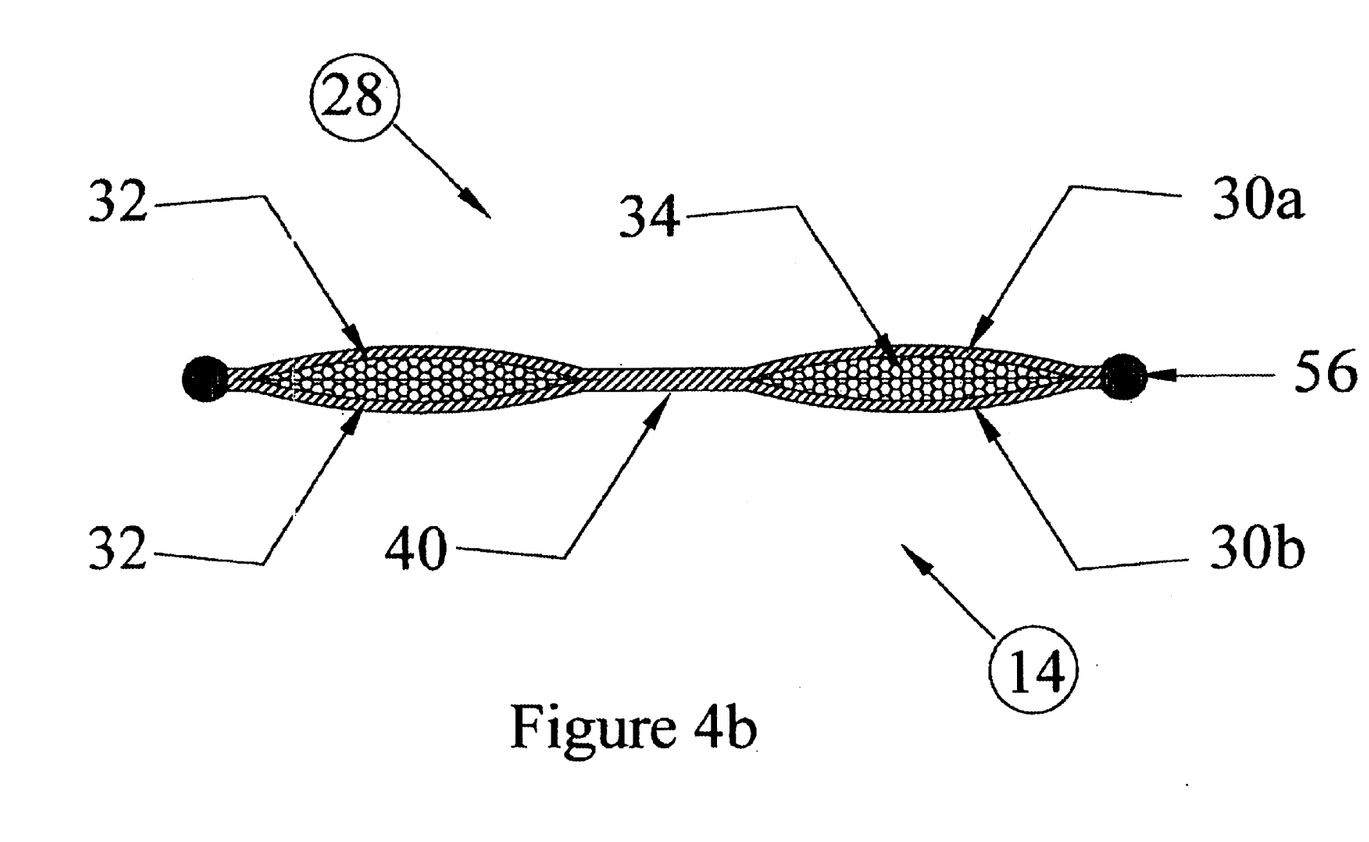
FIG. 4b is a cross-sectional view of the second embodiment of the tape used in the digital display measure device of the present invention.
Figure 5A:
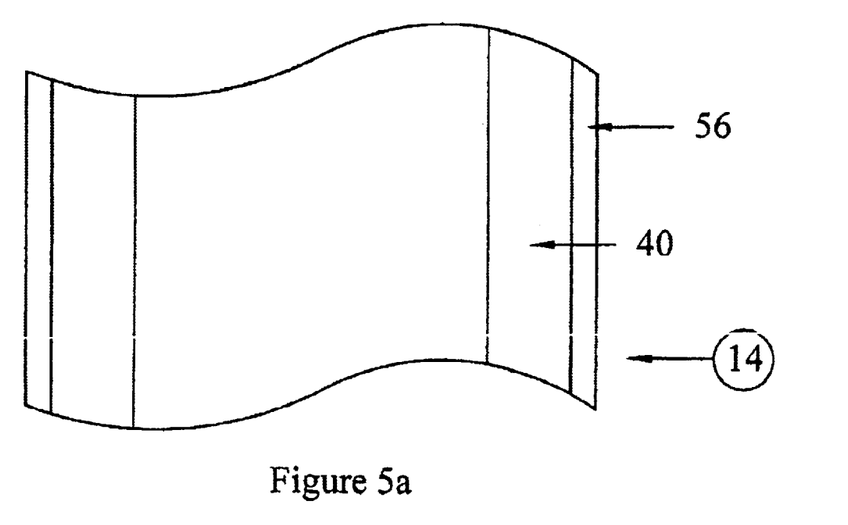
FIG. 5a is a top view of the third embodiment of the tape used in the digital display measure device of the present invention.
Figure 5B:
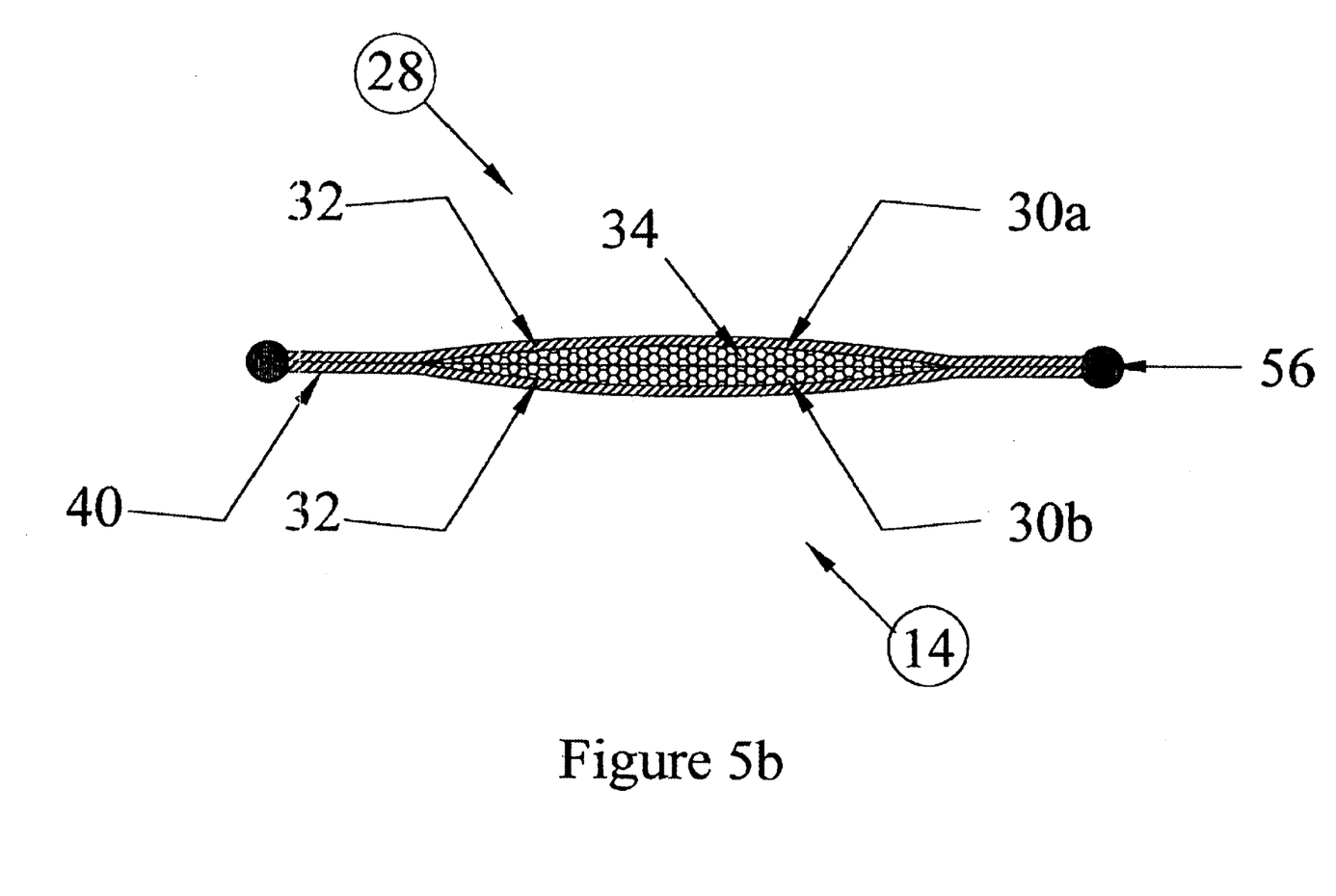
FIG. 5b is a cross-sectional view of the third embodiment of the tape used in the digital display measure device of the present invention.

In order to provide for such a configuration, the present invention 10, as seen in FIGS. 1 and 2, comprises a housing 12 adapted to house and maintain a retractable tape 14 that is wound around a reel 16. Exteriorly located on the housing is a display screen 18 that will display the measured distance. Operating the unit is done via the use of a plurality of function buttons 20. The function buttons 20 will enable a plurality of functions to occur as desired, such as, but not limited to storing the measured distance, converting the distance from metric to English measurements, converting from English to metric, or the like.

To allow for computing or storage to take place, the present invention includes a microprocessor 22 located therein. This microprocessor is coupled to the function buttons 20 and to a power source 24a or 24b. Moreover, the function buttons 20 may be used as data entry when the microprocessor is used as a calculator. The microprocessor 22 also receives input signals from sensors described hereinbelow in order to compute the distances measured with the tape 14. The power source may be conventional batteries 24a, solar cell 24b or the like. The microprocessor will determine the distance from data supplied thereto and feed the computed distance to the display 18. Using the function buttons, the user can store, retrieve, calculate or display any particular measurement.

The measuring system of the present invention will provide for the tape 14 to include a unique structure for enabling various embodiments to be utilized for determining the length of the particular measurement. Enabling for such a configuration, the tape 14 comprises an elongated flexible polymer casing 28 having low stretch characteristics. This tape is seen in FIGS. 3a through 6b. As seen, the tape includes an upper surface 30a and a lower surface 30b to provide for a hollow interior. The tip or start of the tape is physically and ohmically coupled together. Located exteriorly on a side of the tape are conventional visible graduations for representing a particular measurement. The use of these visible graduations provides a manual means for the user to read and determine a particular measurement via the tape in the usual manner.

Located within the casing of the tape on the upper surface and the lower surface is a circuit film 32 that surrounds a non-conductive liquid gel 34. This circuit film is a continuous member that extends the entire length of the tape and thus will provide for a film to be located above and below the non-conductive liquid gel 34. Located above the circuit film 32 and on the upper surface and lower surface of the casing is at least one wear surface 44, which is also an electrical insulator. This wear surface on the upper and lower surfaces is adapted to contact a friction bearing 36 (illustrated in FIG. 1). The friction bearing rotates on the wear surface as the tape is extracted from the housing. This wear surface is also known as the friction bearing surface 40.

Figure 7:
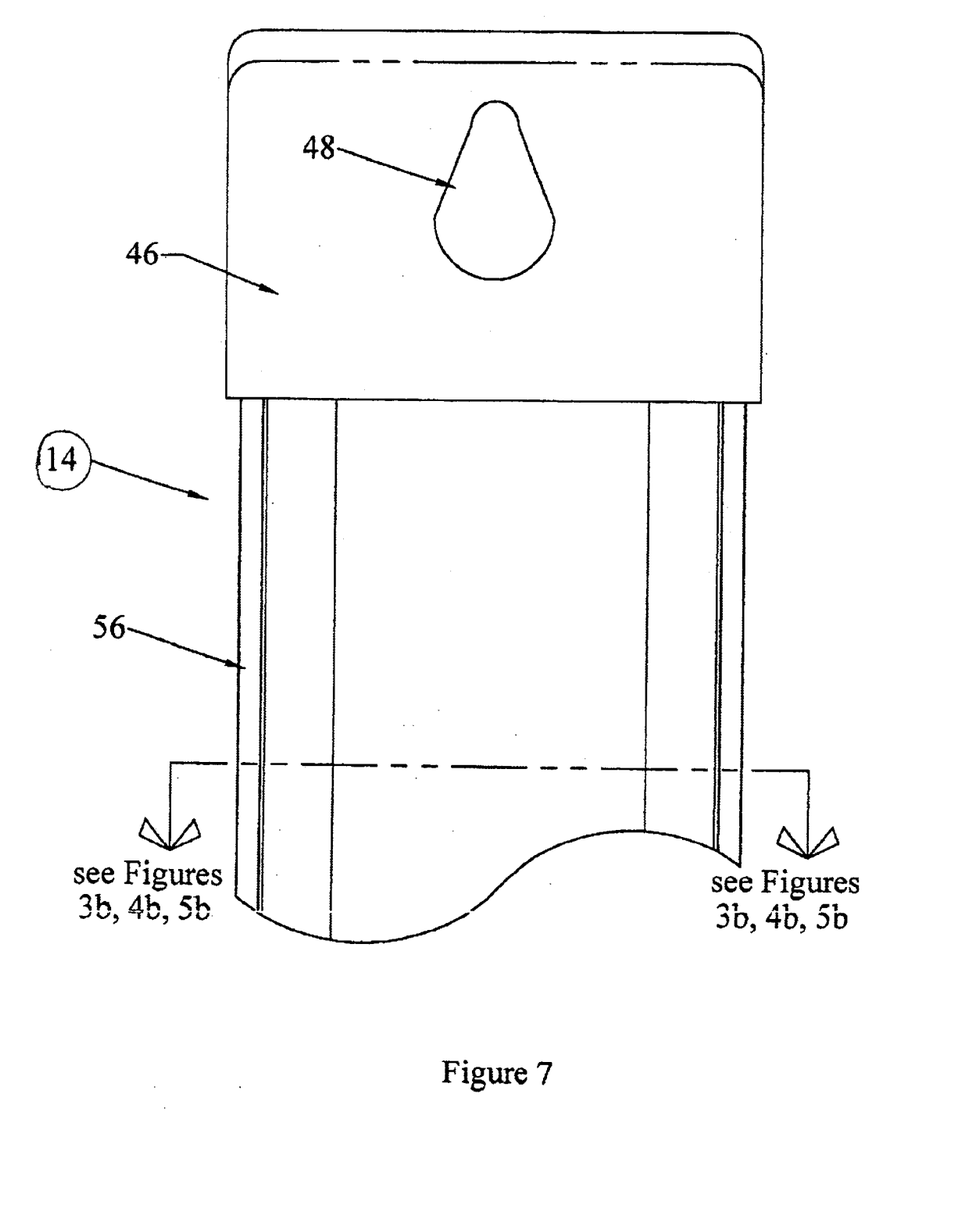
FIG. 7 is an end view of the tape used with the digital display measure device of the present invention.

In a first embodiment for determining a measured length, resistance measurement is utilized. In this configuration, as the tape 14 is extracted from the housing 12, it passes through the friction bearing 36. This movement causes the bearings to rotate as the tape is extracted. The friction bearing applies pressure to the strip via the wear surfaces located on the upper and lower surface of the tape, thereby forcing the liquid gel to the reel end of the tape strip. At the same time, the circuit film located in proximity to the upper and lower surfaces 30a and 30b make ohmic contact at the point of the bearing. The tip of the tape is coupled together, as seen in FIG. 7, and the tape is isolated electrically between the two sides thereof by the insulating bearing surface 44. The bearings 36 make electrical contact with each side of the film, wherein a complete electrical circuit is consequently formed. That is, the electrical circuit includes one side of the bearing 36 making ohmic contact with the tape surface, the stretch of tape extending to the tip thereof, back along the stretch of tape (on the other side opposite the bearing surface 44) to a second side of the bearing 36, which is electrically insulated from the first side thereof. An ohmmeter 80 (FIG. 8) is coupled across the bearings 36 for making ohmic contact with each of end of the circuit. Once the closed circuit is formed, the ohmmeter 80 provides a readout to the microprocessor 22 which computes the distance measured as a function of the resistance measured in the circuit. This measured resistance in the circuit is applied to a linear algorithm programmed in the microprocessor 22, which computes the amount of tape extracted. The computed measurement, calculated via the microprocessor, is displayed on the display screen 18.

Figure 6A:
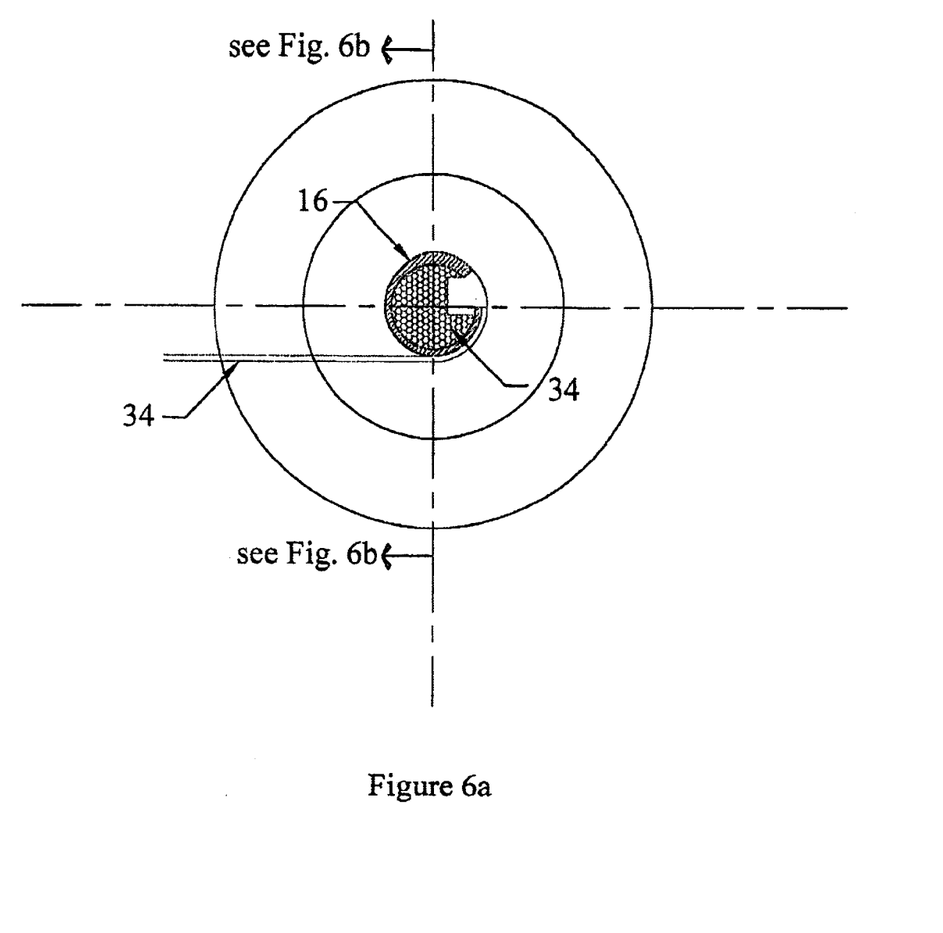
FIG. 6a is a side view of an alternative embodiment for measurement used with the digital display measure device of the present invention.
Figure 6B:
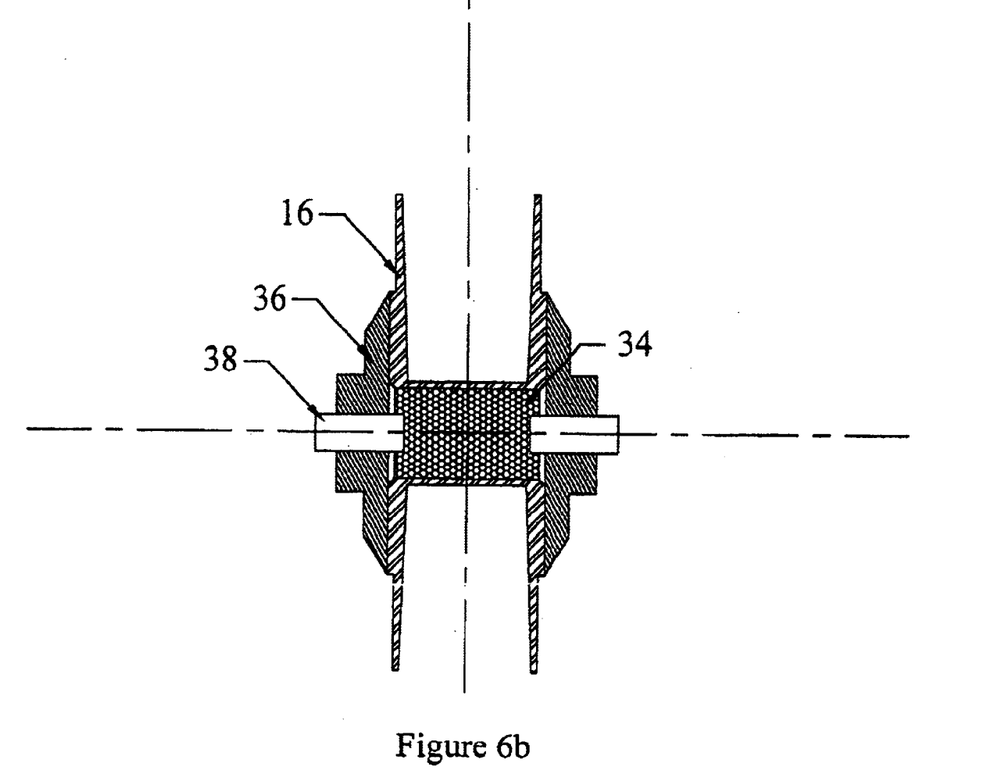
FIG. 6b is a cross-sectional view of an enlarged view of the pressure chamber used with the alternative measurement device shown in FIG. 6a that is utilized for the digital display measuring device of the present invention.

In addition to providing a closed circuit, the friction bearing 36 also provides for a differential in volume between the end of the tape to the friction bearing and from the friction bearing to the reel. The friction bearing 36 pinches on the casing (upper surface 30a and lower surface 30b of the film) forcing the area of contact of the wear surfaces to be free of liquid gel 34. The pinching action may be seen in the cross-sectional view of FIG. 8. This pinching action causes the gel in the tape 14 to be squeezed back into the reel side of the device 10. Accordingly, the pressure of the gel (which increases as the tape is extracted) may be measured within the casing. Knowing the beginning pressure (i.e., pressure when the tape is fully coiled up), and comparing it with the pressure when the tape is extended via a pressure sensor 38, the distance may be calculated. A linear relationship exists between the pressure of the gel and the distance the tape 14 is extended. Accordingly, the microprocessor can compute the distance measured as a function of the measured gel pressure. As seen in FIGS. 6a and 6b, the tape reel 16 is maintained on a reel bearing 42. The sensors are located in proximity to the reel bearings 42. These sensors 38 measure the pressure of the gel that is located within the tape from the point at which contact is made at the friction bearing 34 to the tape reel. Sensing the difference in pressure a distance is calculated by the microprocessor and displayed the screen 18.

The methods defined above utilize a tape that may include a varied number of embodiments. The embodiments are illustrated in FIGS. 3a–5b. As seen, the friction bearing surface 40 can be centrally located on the tape 14, as seen in FIGS. 3a–4b. In this design, the circuit film would be located on either side of the wear surface 40. In an alternative embodiment, the wear surface 40 can be located on opposite sides of the length of the film. Optionally, and preferably, the bearing surface 40 would extend the entire horizontal length of the film and thus when contact is made it will prevent any gel from extending across the location of the bearing. In addition, apertures or perforations 44 can extend therethrough and can be a means of marking the item measured. Thereby providing for a pencil, pen or the like to be adapted to be inserted into the aperture for marking the particular item measured.

To further assist the user, the end 46 of the tape 14, as seen in FIG. 7, can include an anchoring device 48 for enabling the end to be secured to a particular surface. In addition, an additional aperture or the like, illustrated, but not labeled can extend through the end of the tape so as to provide for an additional means of anchoring.

Figure 8:
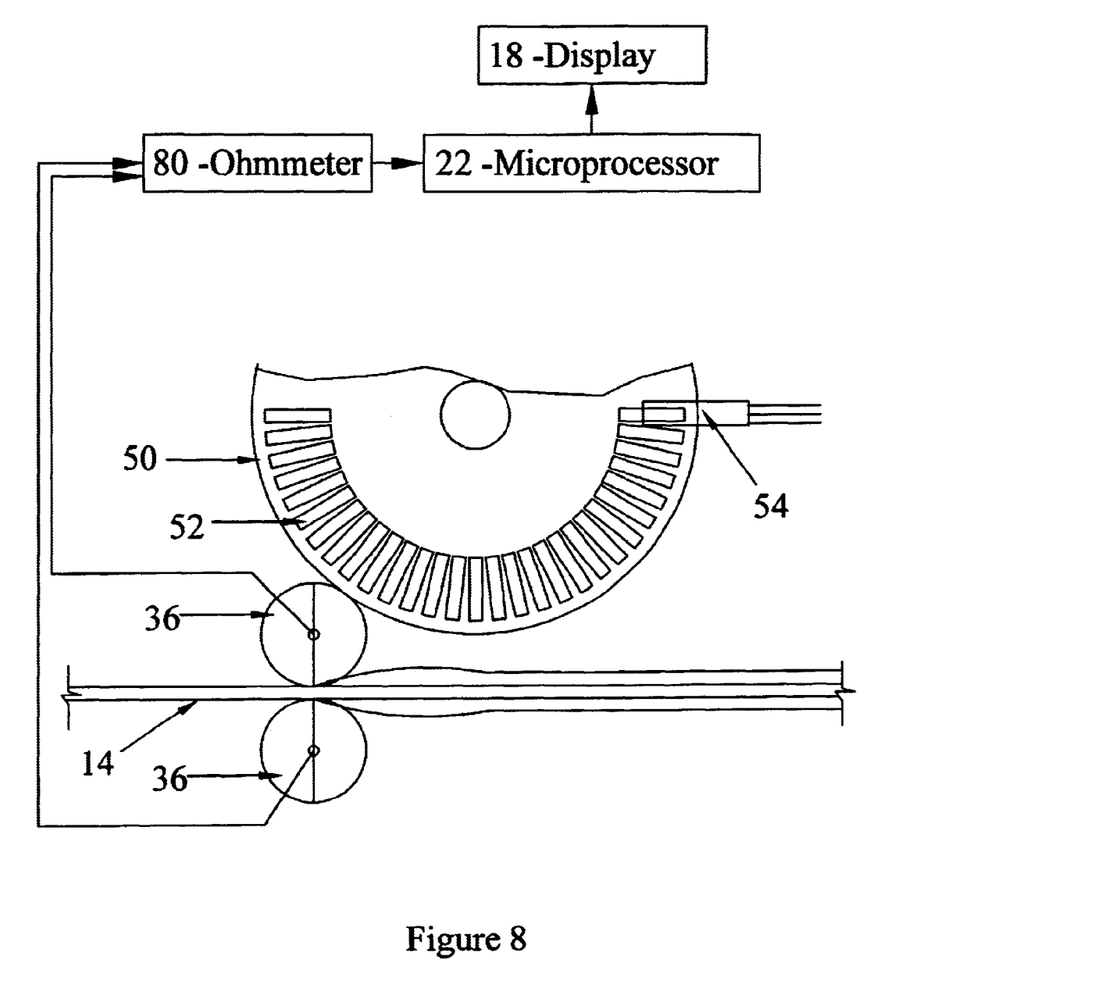
FIG. 8 is a cross-sectional view of an alternative embodiment for measurement used with the digital display measure device of the present invention.

Another method may be provided for measuring distance. This added method employs magnets wherein the magnets are used for sensing linear position. In order to allow for such a configuration, as seen in FIG. 8, a friction gear 50 is provided. This gear 50 is coupled to the friction bearing 36. As the tape is pulled from the housing, it passes through the friction bearing 36. This causes the bearing 36 to rotate consequently causing the friction gear 50 to rotate. To aid in the rotation, teeth may be located on the friction gear and the bearing. The teeth, if provided on the bearing 36 is used, it can be interlockable with perforations 44 that are provided on the tape 14.

Secured to the side of the friction gear is a plurality of magnets 52. Located above the friction gear 50 is a linear magnetic sensor 54, such as a linear Hall Effect Sensor. The magnets form a magnet field and as each magnet passes it is recognized by the linear sensor. After seizing rotation, the linear sensor can determine the distance traveled which is equal to the length of the measurement.

In use, at least one of the means of measurement is used for the tape measuring device of the present invention. In the preferred embodiment, at least two are utilized for providing an adequate and accurate means for determining a particular measurement.

Other features may be added for enhancing the utility of the present invention. These features include providing the tape strip with a synthetic optical fiber 56 that can be located on the outer ends of the tape. This will provide for added illumination for inherently providing an increase in visibility of the tape when in use. As seen in FIG. 1, the housing can be equipped with a hanging mechanism 58 that enables the present invention to be hung on a nail or the like. A bubble level 60 can also be provided so as to render for a multipurpose tape measure device. This bubble level will allow for the present invention to act as a level. A writing implement holding element 62 may also be provided. In addition, a laser pointer 64 can be attached to the housing.

The housing may also be configured so as to have an end that is pivotally secured. This will provide for a unit that may be utilized even in awkward positions. To provide for such a configuration, as seen in FIG. 1, the front end 66 is pivotally secured via a conventional pivot mechanism 68 to the rear of the housing 12. This will provide for a slit or opening to be located on the end wall 70 of the rear of the housing and a corresponding opening to be located on the end wall 72 of the front end 66. Thus, each side includes a wall. The opening will provide for the tape to extend therethrough.

While the present invention has been particularly shown and described with reference to an embodiment thereof, it will be understood by those skilled in the art that various changes in form and detail may be made without departing from the spirit and scope of the present invention.

I claim:

1. A digital display tape measuring device including a housing having a reel adapted to house and maintain a retractable tape, said device comprising:
   a. a display screen exteriorly located on said housing for displaying the measured distance;
   b. a tape having an elongated hollow casing with low stretch characteristics and electrical conductivity capabilities;
   c. an insulator disposed longitudinally along said tape dividing said tape into two electrical conductors, and having a tip thereof electrically connecting both of said electrical conductors together such that an electrical circuit is formed with resistance that varies as said tape is extracted from said reel;
   d. friction bearings disposed in said housing and on either side of said tape for pinching said tape flat when it is extracted from said reel, and at least two of said friction bearings being insulated from one another and each making ohmic contact with respective sides of said tape;
   e. an ohmmeter electrically coupled across said insulated friction bearings such that an electrical current may be passed through said electrical circuit for measuring the resistance thereof by said ohmmeter; and,
   f. a microprocessor disposed in said housing and having inputs thereof coupled to outputs of said ohmmeter and having outputs coupled to said display screen, said microprocessor being disposed for computing measurements made by said device as a function of the resistance measured by said ohmmeter and for displaying the results of said computation on said display screen.

2. The device as in claim 1 further including:
   g. non-conductive liquid gel disposed within said elongated hollow casing of said tape, said gel being evenly distributed along the full length of said tape and being squeezed out of said hollow casing back toward said reel as said tape is extracted from said device;
   h. a pressure gauge disposed on said reel for measuring the pressure of said gel, said pressure gauge having an output coupled to an input of said microprocessor, whereby pressure of said gel increases as said tape is extracted which is used by said microprocessor to compute the distance measured by said tape and display the same on said display screen.

3. The device as in claim 1 further including:
   g. a plurality of magnets disposed for sensing linear position, said magnets being secured to the side of a friction gear coupled to said friction bearings, whereby as said tape is pulled from said housing said friction gear rotates; and,
   h. a linear magnetic sensor, such as a linear Hall Effect Sensor, having an output coupled to an input of said microprocessor and being disposed in close proximity to said friction gear such that as each magnet passes it is recognized by said linear sensor, said microprocessor computing the distance traveled by said tape as a function of the number of pulses generated by said linear sensor which determines the length of the measurement and displays it on said display screen.

4. The device as in claim 1 further including a solar cell power source.

5. The device as in claim 1 further including a laser pointer.

6. A digital display tape measuring device including a housing having a reel adapted to house and maintain a retractable tape, said device comprising:
   a. a display screen exteriorly located on said housing for displaying the measured distance;
   b. a tape having an elongated hollow casing with low stretch characteristics and electrical conductivity capabilities;
   c. non-conductive liquid gel disposed within said elongated hollow casing of said tape, said gel being evenly distributed along the full length of said tape;
   d. friction bearings disposed in said housing and on either side of said tape for pinching said tape flat when it is extracted from said reel, wherein said gel is squeezed out of said hollow casing back toward said reel as said tape is extracted from said device;
   e. a pressure gauge disposed on said reel for measuring the pressure of said gel, whereby the pressure of said get increases as said tape is extracted from said reel and this pressure increase linearly relates to the distance measured by said tape; and,
   f. a microprocessor disposed in said housing and having inputs thereof coupled to said pressure gauge and outputs coupled to said display screen, said microprocessor being disposed for computing measurements made by said device as a function of the pressure measured by said pressure gauge and for displaying the results of said computation on said display screen.

7. The device as in claim 6 further including:
   g. an insulator disposed longitudinally along said tape dividing said tape into two electrical conductors, and having a tip thereof electrically connecting both of said electrical conductors together such that an electrical circuit is formed with resistance that varies as said tape is extracted from said reel;
   h. at least two of said friction bearings being insulated from one another and each making ohmic contact with respective sides of said tape;
   i. an ohmmeter electrically coupled across said insulated friction bearings such that an electrical current may be passed through said electrical circuit for measuring the resistance thereof by said ohmmeter; and,
   j. the microprocessor disposed in said housing and having inputs thereof coupled to said ohmmeter and outputs coupled to said display screen, said microprocessor being disposed for computing measurements made by said device as a function of the resistance measured by said ohmmeter and for displaying the results of said computation on said display screen.

8. The device as in claim 6 further including:

g. a plurality of magnets disposed for sensing linear position, said magnets being secured to the side of a friction gear coupled to said friction bearings, whereby as said tape is pulled form said housing said friction gear rotates; and, h. a linear magnetic sensor, such as a linear Hall Effect Sensor, having an output coupled to an input of said microprocessor and being disposed in close proximity to said friction gear such that as each magnet passes it is recognized by said linear sensor;

said microprocessor computing the distance traveled by said tape as a function of the number of pulses generated by said linear sensor which determines the length of the measurement and displays it on said display screen.

9. The device as in claim 6 further including a solar cell power source.

10. The device as in claim 6 further including a laser pointer.

11. A digital display tape measuring device including a housing having a reel adapted to house and maintain a retractable tape, said device comprising:

a. a display screen exteriorly located on said housing for displaying the measured distance;

b. a tape having an elongated hollow casing with low stretch characteristics and electrical conductivity capabilities;

c. friction bearings disposed in said housing and on either side of said tape for pinching said tape flat when it is extracted from said reel;

d. a plurality of magnets disposed for sensing linear position, said magnets being secured to the side of a friction gear coupled to said friction bearings, whereby as said tape is pulled from said housing said friction gear rotates;

e. a linear magnetic sensor being disposed in close proximity to said friction gear such that as each magnet passes it is recognized by said linear sensor; wherein the distance traveled by said tape is a function of the number of pulses generated by said linear sensor; and, f. a microprocessor disposed in said housing and having inputs thereof coupled to said linear magnetic sensor and outputs coupled to said display screen, said microprocessor being disposed for computing measurements made by said device as a function of the number of pulses received by said magnetic sensor and for displaying the results of said computation on said display screen;

g. an insulator disposed longitudinally along said tape dividing said tape into two electrical conductors, and having a tip thereof electrically connecting both of said electrical conductors together such that an electrical circuit is formed with resistance that varies as said tape is extracted from said reel;

h. at least two of said friction bearings being insulated from one another and each making ohmic contact with respective sides of said tape; and, i. an ohmmeter electrically coupled across said insulated friction bearings such that an electrical current may be passed through said electrical circuit for measuring the resistance thereof by said ohmmeter, and output of said ohmmeter being coupled to inputs of said microprocessor such that said microprocessor computes the distance measured by said tape as a function of the resistance measured and displays this distance on said display screen.

12. The device as in claim 11 further including:

j. non-conductive liquid gel disposed within said elongated hollow casing of said tape, said gel being evenly distributed along the full length of said tape and being squeezed without said hollow casing back toward said reel as said tape is extracted from said device; and, k. a pressure gauge disposed on said reel for measuring the pressure of said gel, said pressure gauge having an output coupled to an input of said microprocessor, whereby pressure of said gel increases as said tape is extracted which is used by said microprocessor to compute the distance measured by said tape and display the same on said display screen.

13. The device as in claim 11 further including a solar cell power source.

14. The device as in claim 11 further including a laser pointer.

* * * * *